United States Patent [19]

Casey et al.

[11] Patent Number: 5,179,835
[45] Date of Patent: Jan. 19, 1993

[54] BRAKE VALVE FOR USE IN LOAD SENSING HYDRAULIC SYSTEM

[75] Inventors: Todd A. Casey, Victoria, Minn.; Alan D. Jackson, Halstead, Kans.

[73] Assignee: Eaton Corporation, Cleveland, Ohio

[21] Appl. No.: 745,628

[22] Filed: Aug. 15, 1991

[51] Int. Cl.⁵ ............................................. F16D 31/02
[52] U.S. Cl. .................................... 60/386; 60/402; 60/421; 60/422; 60/427; 91/514; 91/516; 91/517; 91/532
[58] Field of Search ............... 60/402, 421, 422, 427, 60/386; 91/514, 516, 517, 532

[56] References Cited

U.S. PATENT DOCUMENTS

| | | | |
|---|---|---|---|
| 2,945,352 | 7/1960 | Stelzer | 60/386 X |
| 3,166,890 | 1/1965 | Krehbiel | 60/421 X |
| 4,043,419 | 8/1977 | Larson et al. | 60/420 X |
| 4,044,786 | 8/1977 | Yip | 60/421 X |
| 4,253,382 | 3/1981 | Yip | 91/517 X |
| 4,418,710 | 12/1983 | Johnson | 91/516 X |
| 4,663,936 | 5/1987 | Morgan | 91/516 X |
| 4,977,928 | 12/1990 | Smith et al. | 91/516 X |

Primary Examiner—John T. Kwon
Assistant Examiner—Todd Mattingly
Attorney, Agent, or Firm—L. J. Kasper

[57] ABSTRACT

A brake valve (45) is disclosed of the type which permits communication from a source (11) of pressurized fluid to a brake actuator (47) in response to manual movement of a valve spool (57) from a neutral position (FIG. 2) to a power brake position (FIG. 5). In the power brake position, the valve spool permits fluid communication between a work port (53), which communicates with a brake actuator, and a brake load signal chamber (87), the brake load signal controlling the fluid output of the source. As the valve spool moves toward a manual brake position (FIG. 6) communication between the work port and the brake load signal chamber is blocked. In the manual brake position, movement of the valve spool causes a large piston (63) to displace fluid from its piston bore (73) into a piston bore (75) in which is disposed a small piston (61), the small piston being operable in response to movement of the valve spool to build brake pressure in the work port (53). A relief valve arrangement (137,139,141) relieves fluid pressure in the larger piston bore (73) to limit the manual force required to move the valve spool and the pistons.

10 Claims, 5 Drawing Sheets

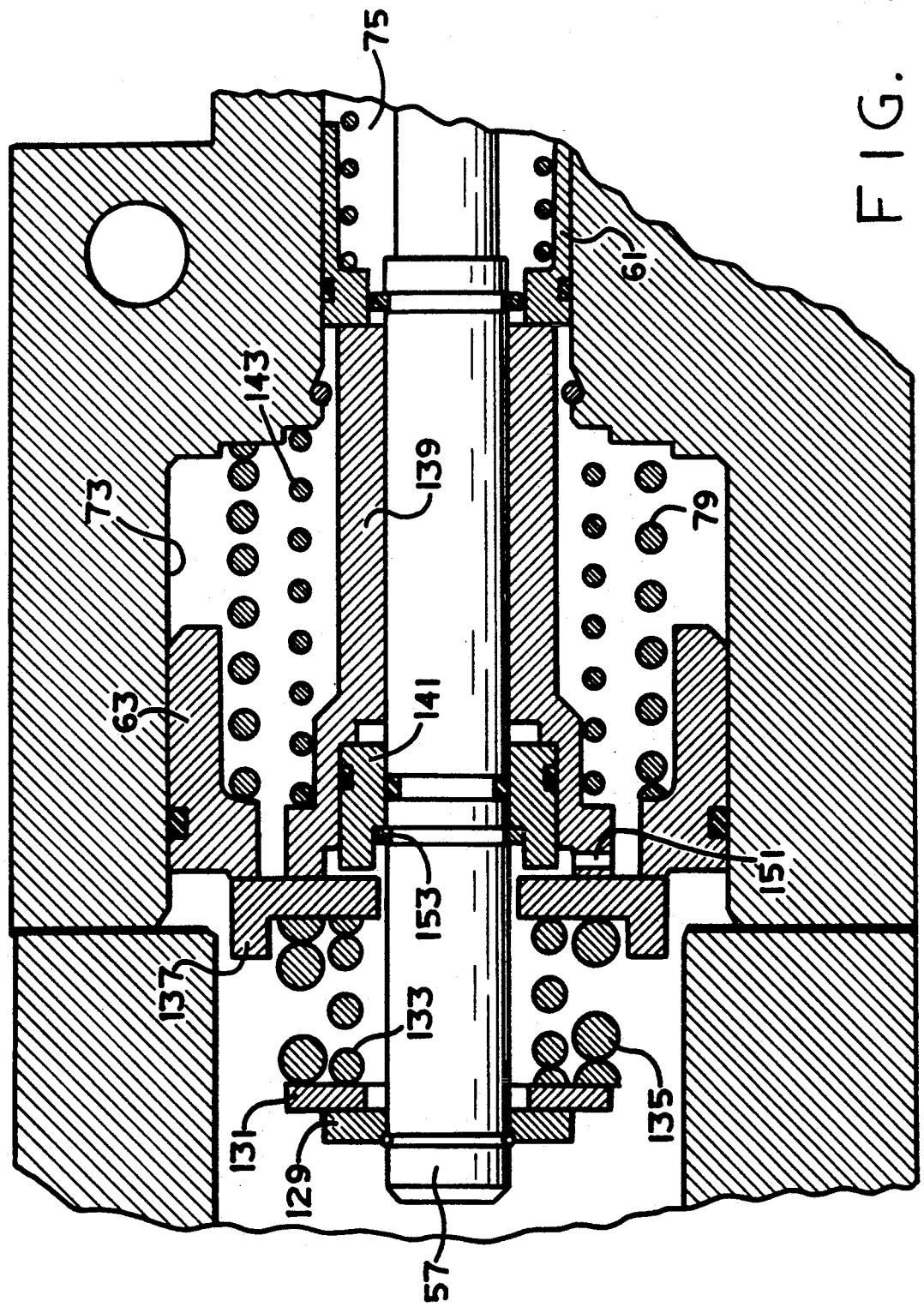

BRAKE VALVE FOR USE IN LOAD SENSING HYDRAULIC SYSTEM

BACKGROUND OF THE DISCLOSURE

The present invention relates generally to brake valves for use in vehicle hydraulic systems, and more particularly, to such brake valves of the type which include a manually movable valve member.

Furthermore, the brake valve of the present invention is especially advantageous when used in a vehicle hydraulic system in which the brake valve is connected hydraulically in parallel with another circuit, such as the vehicle power steering system, with both the brake valve and the steering circuit being supplied with pressurized fluid from a common fluid source.

Brake valves of the type to which the present invention relates typically have two operating modes. In a "powered" brake mode, the brake valve communicates pressurized fluid from the source to a brake actuator. In a "manual" brake mode, there is no external source of pressurized fluid available, and movement of the valve spool, by depressing the brake pedal, moves a piston arrangement to generate pressurized fluid for the brake actuator. An example of such a brake valve is illustrated in U.S. Pat. No. 3,166,890, assigned to a predecessor-in-interest of the assignee of the present invention, and incorporated herein by reference.

Increasingly, vehicles utilizing brake valves of the type to which the invention relates have also been utilizing load sensing hydraulic (hydrostatic) power steering systems, and load sensing fluid sources. An example of such a load sensing vehicle hydraulic system is illustrated and described in detail in U.S. Pat. No. 4,043,419, assigned to the assignee of the present invention, incorporated herein by reference.

SUMMARY OF THE INVENTION

Accordingly, it is an object of the present invention to provide an improved brake valve for use in load sensing vehicle hydraulic systems, and especially, for use in such systems having a single, load sensing fluid pressure source for the entire hydraulic system.

It is a further object of the present invention to provide a brake valve which accomplishes the above-stated object and, at the same time, makes it possible to utilize smaller, less expensive brake actuators.

The above and other objects of the present invention are accomplished by the provision of a brake valve for use in a hydraulic system of the type including a source of pressurized fluid and means operable to vary the fluid output of the source in response to a system load signal. A priority hydraulic circuit is connected to receive pressurized fluid from the source, in parallel with the brake valve, the priority circuit including means operable to generate a priority load signal representative of the demand for fluid by the priority hydraulic circuit. The brake valve is of the type including housing means defining a fluid inlet port adapted to be connected to the source of pressurized fluid, a work port adapted to be connected to a fluid pressure operated brake actuator, a return port adapted to be connected to a system reservoir, and a valve bore interconnecting the fluid inlet port, the work port, and the return port. A valve spool is reciprocable in the valve bore and has an end extending outside the housing means for forcible, manual reciprocation of the valve spool. The valve spool has a neutral position blocking fluid communication from the fluid inlet port to the work port, a power brake position permitting fluid communication from the inlet port to the work port, and a manual brake position in which a piston assembly is operable to generate fluid pressure at the work port, in response to movement of the valve spool, and in the absence of pressurized fluid at the fluid inlet port.

The improved brake valve is characterized by the housing means defining a brake load signal chamber adapted to be connected to the system load signal. The valve spool, in the neutral position, blocks fluid communication between the work port and the brake load signal chamber, and permits fluid communication between the brake load signal chamber and the return port. The valve spool, in the power brake position, blocks fluid communication between the brake load signal chamber and the return port, and permits fluid communication between the work port and the brake load signal chamber. Finally, the valve spool, in the manual brake position, blocks fluid communication between the work port and the brake load signal chamber.

BRIEF DESCRIPTION OF THE DRAWINGS

FIG. 8 is a further enlarged, fragmentary, axial cross-section, similar to FIG. 1, corresponding to the manual brake position shown in FIG. 6.

DESCRIPTION OF THE PREFERRED EMBODIMENT

Figure 1:
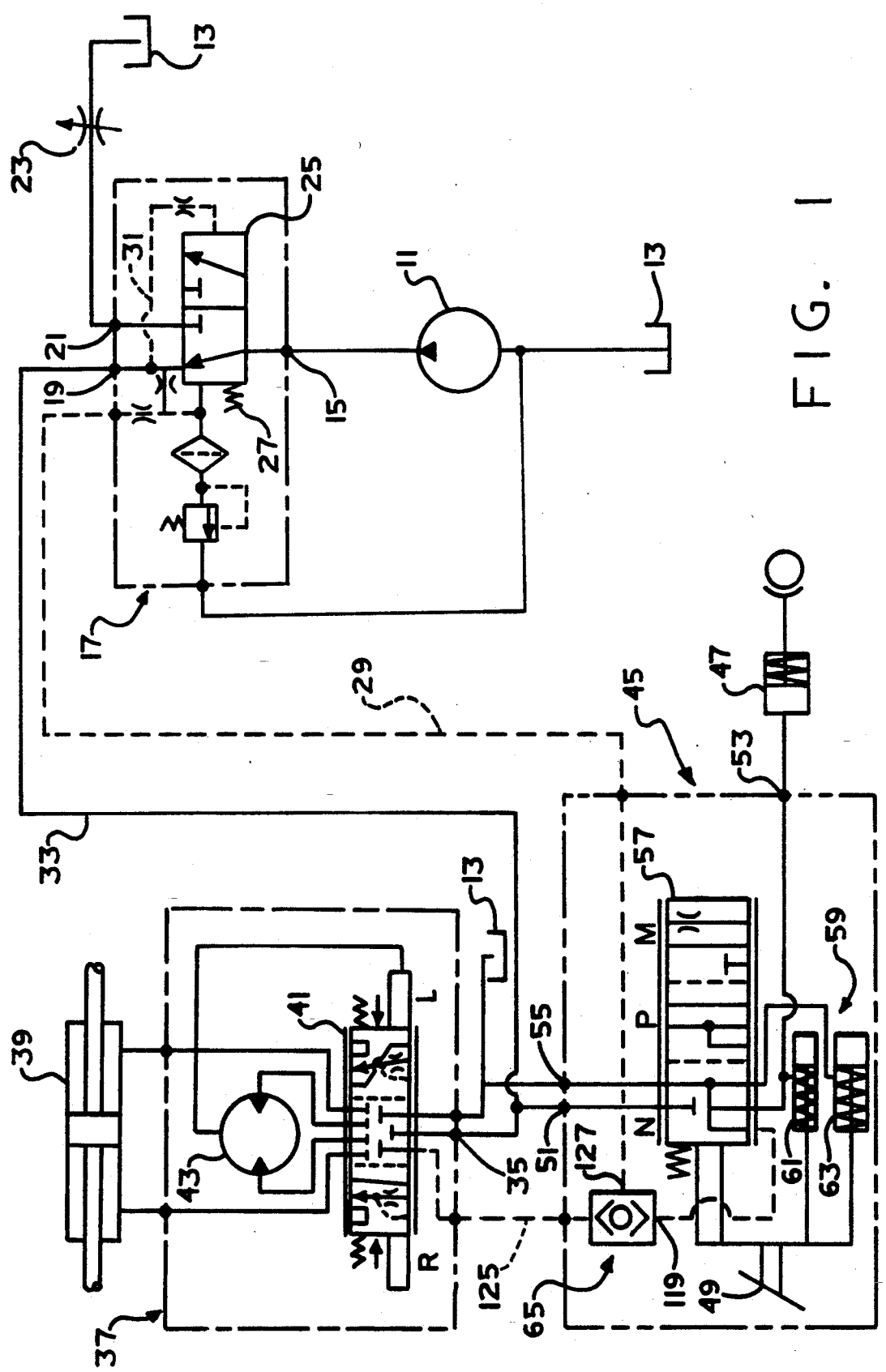
FIG. 1 is a hydraulic schematic of a load sensing vehicle hydraulic system including the brake valve of the present invention.

Referring now to the drawings, which are not intended to limit the invention, FIG. 1 illustrates a load sensing, vehicle hydraulic system of the type with which the brake valve of the present invention may be utilized. The system includes a fixed displacement fluid pump 11 having its inlet connected to a system reservoir 13. The outlet of the pump 11 is connected to an inlet port 15 of a load sensing priority flow control valve 17, which is preferably of the type illustrated and described in above-incorporated U.S. Pat. No. 4,043,419.

The priority valve 17 includes a priority outlet port 19, and an excess flow outlet port 21, which is connected to an auxiliary hydraulic circuit, which forms no part of the present invention, and which is represented in FIG. 1 by a variable orifice 23. The priority valve 17 includes a valve spool 25, which is biased by a spring 27 toward a position permitting substantially all fluid to flow from the inlet port 15 to the priority outlet port 19.

The spring 27 is aided by the pressure in a load signal line 29, acting against the end of the valve spool 25. In opposition to these biasing forces is the pressure exerted by a pilot signal 31, communicated from upstream of the priority outlet port 19, and acting on the opposite end of the valve spool 25. The general structure and operation of the priority valve 17 are well known in the art, and, because they form no part of the present invention, will not be described further herein. In addition, it should be understood that the present invention is not even limited to the use of the priority valve 17, but merely requires that the system include a variable fluid delivery source, in which the fluid output of the source is variable in response to a load signal, such as the load signal 29. As merely one example, the fixed pump 11 and priority valve 17 could be replaced by a load sensing pump, having its output variable in response to the load signal 29.

The priority outlet port 19 is connected by means of a conduit 33 to an inlet port 35 of a fluid controller 37, the function of which is to control the flow of fluid to a steering cylinder 39, as is well known to those skilled in the art. The fluid controller 37, which may be of the general type illustrated and described in U.S. Pat. No. Re. 25,126, assigned to the assignee of the present invention, forms no direct part of the present invention, and will be described only briefly herein. Disposed within the fluid controller 37 is a valving arrangement, generally designated 41, which is movable from its neutral position shown in FIG. 1 to either a right turn position R, or a left turn position L. When the valving arrangement 41 is in either of the turn positions, pressurized fluid from the inlet port 35 flows through a fluid meter 43, one function of which is to measure (meter) the proper amount of fluid to be communicated to the steering cylinder 39.

Referring still to FIG. 1, the fluid controller 37 is connected to the conduit 33, in parallel with a brake valve 45, which is operable to communicate pressurized fluid to a fluid pressure operated brake actuator 47, in response to the manual movement (depression) of a vehicle brake pedal 49. It should be noted that the term "priority" is sometimes used hereinafter, in reference to the circuit including the fluid controller 37. The term is used merely to indicate that the circuit connected in parallel with the brake circuit takes priority over the auxiliary circuit 23, although those skilled in the art will understand that, on a typical vehicle hydraulic system, both steering and brakes must be given priority, relative to the other vehicle implements.

A brief description of the brake valve 45 will now be given, with reference to the schematic of FIG. 1; to facilitate an understanding of the brake valve when it is described in greater detail with reference to the subsequent drawing figures. The brake valve 45 includes an inlet port 51, which is connected to the conduit 33. The brake valve 45 further includes a work port 53, connected to the brake actuator 47, and a return port 55, connected to the system reservoir 13. The brake valve 45 includes a valve spool 57, which is movable in response to movement of the brake pedal 49, and a piston arrangement, generally designated 59, including a relatively smaller piston 61 and a relatively larger piston 63. The brake valve 45 also includes a load signal shuttle assembly, generally designated 65, which will be described in greater detail subsequently.

Figure 2:
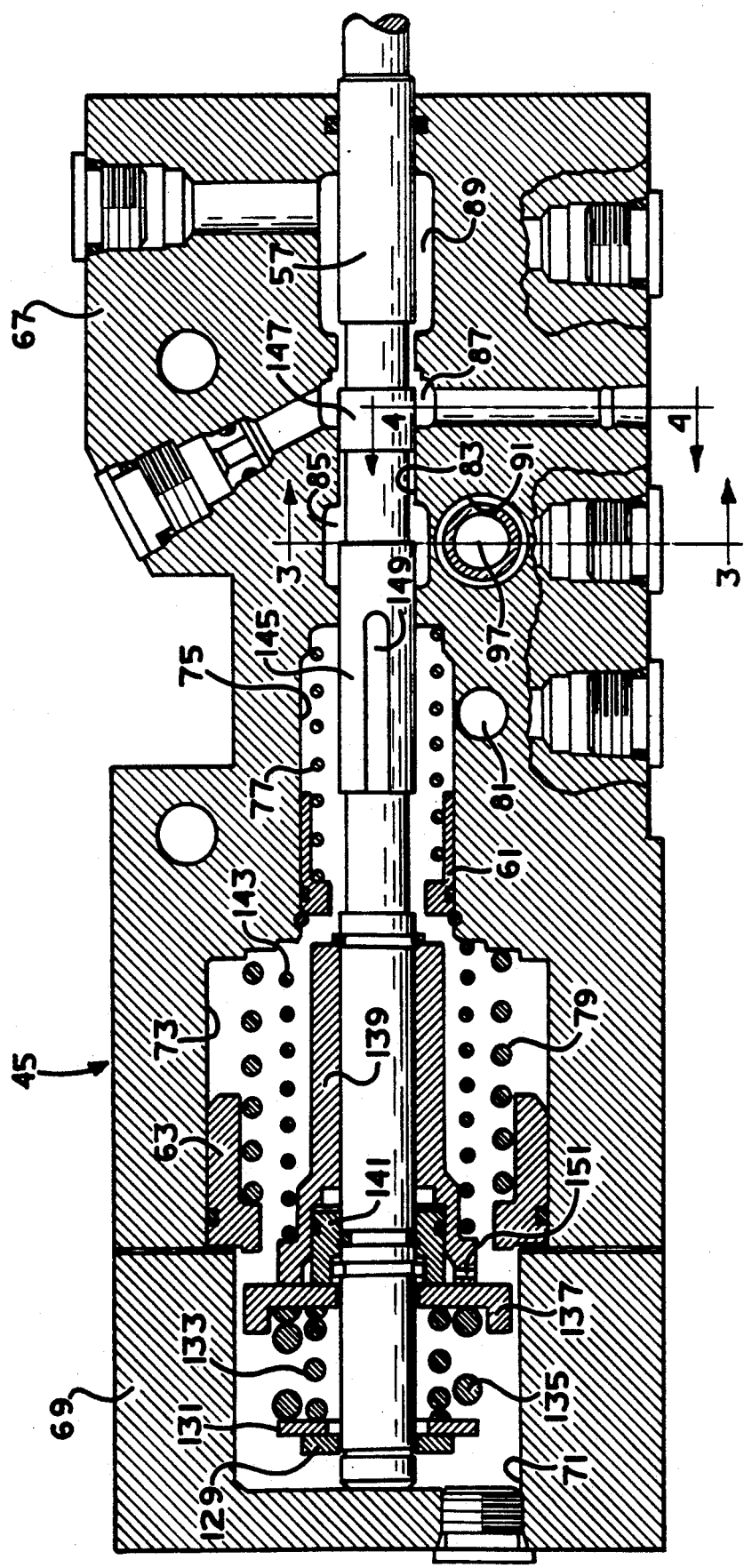
FIG. 2 is an axial cross-section of the brake valve of the present invention, in its neutral position.

Referring now to FIG. 2, the brake valve assembly 45 of the present invention will be described in some detail.

The brake valve includes a housing means comprising a body 67 and an end cap 69 which may be attached to the body 67 by any suitable means. The end cap 69 defines an opening or bore portion 71, which is in communication with the system reservoir 13. Adjacent the bore portion 71, the body 67 defines an opening or bore portion 73, within which is slidably disposed the relatively larger piston 63. To the right (in FIG. 2) of the bore portion 73, the body 67 defines a relatively smaller bore portion 75, within which is slidably disposed the relatively smaller piston 61. The smaller piston 61 is biased to the position shown in FIG. 2 by a spring 77, while the larger piston 63 is biased to its position, as shown in FIG. 2, by a spring 79. The bore portion 75 is in open communication with the work port 53 (shown only in FIG. 1) by means of a transverse bore 81.

The body 67 also defines a spool bore 83, which receives the valve spool 57 for movement therein. Disposed along the spool bore 83 are several cored cavities, including an inlet cavity 85, a load signal cavity 87, and a return cavity 89. The return cavity 89 is in communication with the return port 55 in a manner not shown in detail in FIG. 2, but which is certainly within the ability of those skilled in the art.

Figure 3:
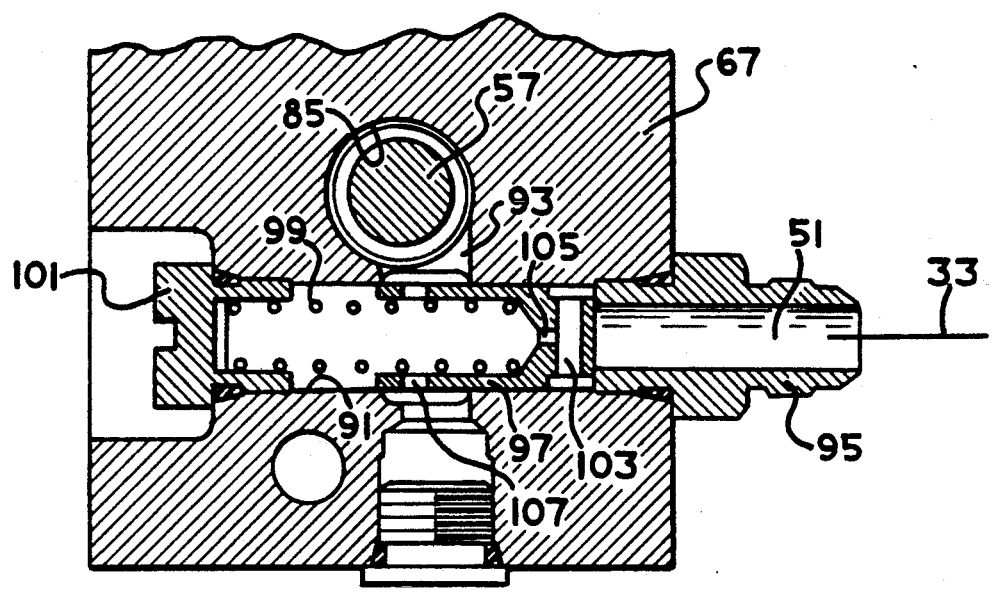
FIG. 3 is an enlarged, transverse cross-section taken through the inlet port, and taken on line 3—3 of FIG. 2.

Referring to FIG. 2, in conjunction with FIG. 3, the body 67 defines a transverse bore 91 which is in open communication with the inlet cavity 85 by means of a passage 93. In threaded engagement with the right end (in FIG. 3) of the bore 91 is a fitting member 95 which defines the fluid inlet port 51. Disposed adjacent the member 95 in the transverse bore 91 is a flow limiting valve 97, which is biased to the position shown in FIG. 3 by means of a spring 99, having its left end seated against a seat member 101, which is also in threaded engagement with the bore 91. The flow limiting valve 97 defines a cross bore 103, which opens into an axial bore 105 which, in turn, opens to the interior of the valve 97. The valve 97 defines a plurality of radial openings 107, through which inlet fluid flows radially outwardly, then flows through the passage 93 into the inlet cavity 85. By way of example only, the flow limiting valve 97 is designed to limit flow through the inlet port 51 to a maximum of about 1 gpm. As the inlet flow approaches that flow rate, the pressure differential across the axial bore 105 increases, biasing the valve 97 to the left in FIG. 3, in opposition to the biasing force of the spring 99, until the openings 107 begin to be partially covered or blocked by the transverse bore 91. A further increase in the flow rate, above 1 gpm, would merely bias the valve 97 further to the left, with the openings 107 being further restricted, thus limiting the flow. The flow limiting valve 97 also serves as a check valve, under certain operating conditions, to be described subsequently.

Figure 4:
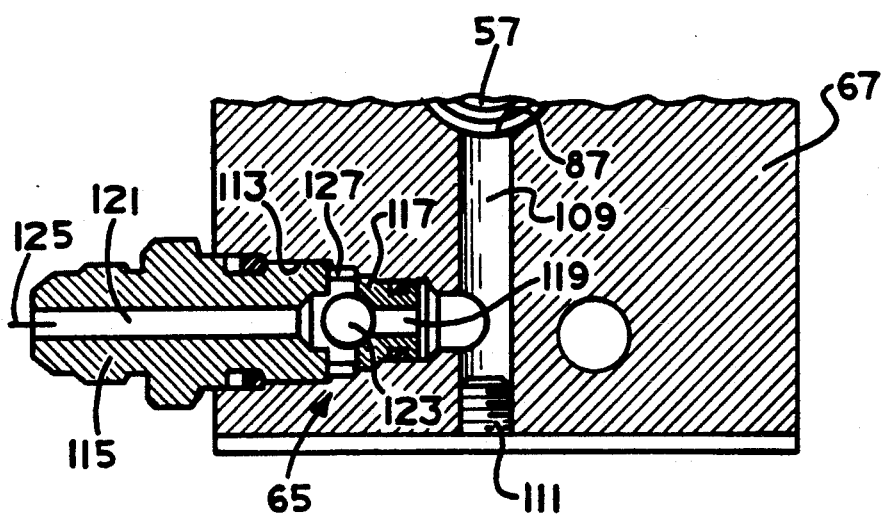
FIG. 4 is an enlarged, transverse cross-section, taken through the shuttle assembly, and taken on line 4—4 of FIG. 2.

Referring now to FIG. 2, in conjunction with FIG. 4, the body 67 defines a vertical passage 109, sealed at its bottom end in FIG. 4 by a plug member 111. In communication with the passage 109 is a stepped bore 113, into which is threaded a fitting member 115. Received within the bore 113, adjacent the passage 109, is a seat 117 which defines a shuttle inlet 119. The fitting member 115 defines another shuttle inlet 121, and disposed between the fitting 115 and the seat 117 is a shuttle ball 123. The shuttle inlet 119 is in open communication with the load signal cavity 87 to transmit to the shuttle assembly 65 a brake load signal, as will be described in greater detail subsequently. The other shuttle inlet 121 receives a steering load signal 125 (see also FIG. 1). As is well known to those skilled in the art. if, by way of example, the steering load signal 125 is higher than the brake load signal, the shuttle ball 123 is biased to the right to the position shown in FIG. 4, such that the shuttle inlet 121 is in communication with a shuttle outlet 127, which in turn, is connected to the load signal line 29, which controls the priority valve 17.

Referring again primarily to FIG. 2, the left end of the valve spool 57 has attached thereto a retainer 129, against which is seated a washer 131. Seated against the washer 131 is a relatively smaller spring 133, and a relatively larger spring 135. Both of these springs 133 and 135 have their right ends disposed against a seat member 137, with the seat member 137 engaging the left end of a transfer sleeve 139, and also engaging the left end of a relief sleeve 141. The transfer sleeve 139 is biased toward engagement with the seat member 137 by means of a biasing spring 143, which has its right end seated against a surface defined by the body 67. A further description of the function of the members just described will be given in connection with the subsequent description of the operation of the brake valve.

OPERATION

Referring still to FIG. 2, when the vehicle operator does not have the brake pedal 49 depressed, the valve spool 57 is biased to the position shown in FIG. 2, which comprises the neutral position. In the neutral position, fluid enters the inlet port 51, and flows through into the inlet cavity 85 in the manner described previously. However, the valve spool 57 includes a spool land 145 disposed between the inlet cavity 85 and the bore portion 75, and blocking flow therebetween. Similarly, the valve spool 57 includes a spool land 147 disposed to block fluid communication between the inlet cavity 85 and the load signal cavity 87. Thus, the brake valve 45 of the present invention may be referred to as "closed center" because, in the neutral position of the valve spool 57, there is no inlet flow. However, in the neutral position, the load signal cavity 87 is in open communication with the return cavity 89, and therefore, the shuttle inlet 119 is drained to the system reservoir, through the passage 109, the load signal cavity 87, and the return cavity 89.

Figure 5:
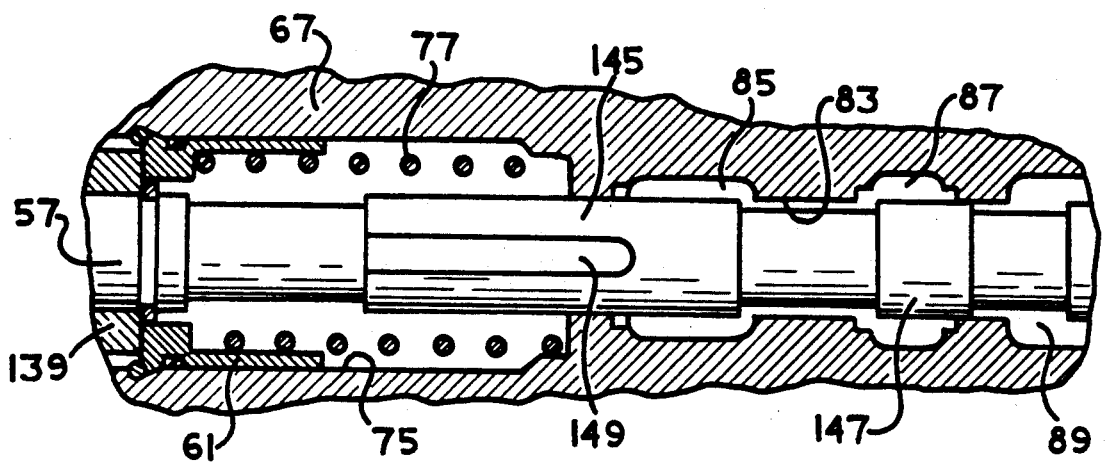
FIG. 5 is an enlarged, fragmentary, axial cross-section, similar to FIG. 2, illustrating the brake valve of the present invention in the power brake position.

Referring now to FIG. 5, in conjunction with FIG. 2, as the vehicle operator depresses the brake pedal 49, the valve spool 57 begins to move to the right in opposition to the force of the biasing spring 143. The spool land 145 defines one or more axial grooves 149 on the outer surface thereof, such that, just before the valve spool 57 reaches the position shown in FIG. 5, the groove 149 begins to provide fluid communication from the inlet cavity 85 to the bore portion 75, and from there, through the bore 81 to the work port 53, thus providing pressurized fluid to the brake actuator 47.

At this point in time, if the fluid pressure in the conduit 33, required to meet the demand of the fluid controller 37, is fairly high (e.g., 2000 psi), the fluid entering the inlet port 51 of the brake valve will also be 2000 psi, and when the groove 149 begins to communicate with the inlet cavity 85, a fluid pressure of 2000 psi would be communicated to the brake actuator 47, which is clearly not desirable. However, as was noted previously, the bore portion 71 is in communication with the system reservoir 13, and as the valve spool 57 begins to move into the power brake position shown in FIG. 5, the bore portions 73 and 75 are still in communication with the system reservoir, through the bore portion 71. When the valve spool 57 reaches the position shown in FIG. 5, the right end of the transfer sleeve 139 is approaching the left end of the smaller piston 61, and therefor, is beginning to restrict fluid communication from the bore portion 75 to the bore portion 73. Thus, the pressure in the bore portion 75 begins to build gradually.

With the valve spool in the power brake position of FIG. 5, the spool land 147 has moved to the right a sufficient distance to close off communication from the load signal cavity 87 to the return cavity 89, and at the same time, has opened communication of the inlet cavity 85 to the load signal cavity 87. Therefor, as pressure begins to build in the bore portion 75, pressure also builds in the inlet cavity 85, and that pressure signal is transmitted through the load signal cavity 87 and passage 109 to the shuttle inlet 119. If the pressure of the load signal 125 from the steering controller 37 is less than the brake load signal at the shuttle inlet 119, the brake load signal will move the shuttle ball 123 to the left in FIG. 4, and will be transmitted to the shuttle outlet 127, thus controlling the priority valve 17 to increase the fluid flow in the conduit 33 to meet the combined demand of the steering controller 37 and the brake valve 45.

Figure 6:
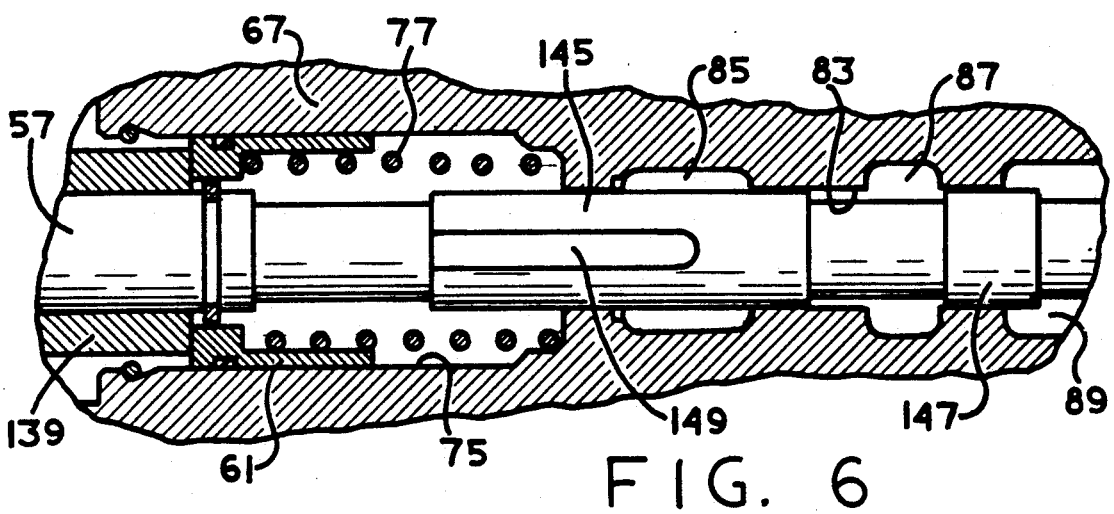
FIG. 6 is an enlarged, fragmentary, axial cross-section, similar to FIG. 5, with the brake valve in the manual brake position.

Referring now to FIG. 6, in conjunction with FIG. 2, there is illustrated in FIG. 6 a position of the valve spool 57 corresponding to a manual brake position, i.e., a position in which there is insufficient fluid pressure at the inlet port 51 to operate the brake actuator 47, and pressure at the work port 53 must be generated manually by movement of the brake pedal 49, and resulting movement of the valve spool 57 and the smaller and larger pistons 61 and 63.

As the valve spool moves from the neutral position to that shown in FIG. 6, the seat member 137 moves to the right also, under the influence of the springs 133 and 135, until the seat member 137 engages the left end of the larger piston 63, and begins to move the piston 63 to the right also. This rightward movement of the larger piston 63 displaces some of the fluid in the bore portion 73, moving it into the bore portion 75, and thus eliminating the dead-band (actuator travel required to close the brake calipers to contact the brake drum) in the brake actuator. Once the actuator dead-band is eliminated, continued movement of the valve spool 57 to the position shown in FIG. 6, with the bore portion 75 now comprising a "closed" chamber, will result in pressure being built in the bore portion 75, in the bore 81, in the work port 53, and in the actuator 47. Continued movement of the valve spool will require greater manual force on the brake pedal 49, but the result will be proportionately increased braking force.

Referring still to FIG. 6, it should be noted that with the valve spool 57 in the manual brake mode, the spool land 145 has moved to the right a sufficient distance to block communication between the inlet cavity 85 and the load signal cavity 87, but because there was presumably little or no fluid pressure in the inlet cavity 85 as the valve spool was moved toward the manual brake mode, the pressure of the fluid trapped in the load signal cavity 87 will be approximately the same as the pressure which was in the inlet cavity 85, just before the spool land 145 blocked communication between the cavities 85 and 87.

As was mentioned previously, one function of the flow limiting valve 97 is to serve as a check valve. In the manual brake mode, pressurized fluid generated at the work port 53 by the smaller piston 61 could flow through the axial groove 149 into the inlet cavity 85, and from there could reverse flow out the inlet port 51, because the fluid pressure in the conduit 33 is instantaneously lower than the brake pressure. However, the generated brake pressure forces the valve 97 to the position shown in FIG. 3, thus blocking such reverse flow out the inlet port 51.

Referring now also to FIG. 8, as the valve spool 57 is moved from the neutral position to the manual brake position, and the larger piston 63 is moving to the right, there would be a tendency for pressure to build in the bore portion 73, which would greatly increase the resistance encountered by the vehicle operator in moving the valve spool. In order to prevent such pressure buildup in the bore 73, there is provided a relief valve assembly, consisting of the springs 133 and 135, the seat member 137, the transfer sleeve 139, and the relief sleeve 141. The relief valve assembly acts initially to relieve the bore portion 73 to the bore portion 71 (and thus, to the system reservoir) at a relief valve setting of, for example, 50 psi., and finally, with sufficient travel of the valve spool 57, totally relieves the bore portion 73 of trapped pressure. During the first stage of operation of the relief valve assembly, the calipers are being closed on the brake drum and presssure in the bore portion 75 is equal to pressure in the bore portion 73. Pressure from the bore portion 75 is exerted on the relief sleeve 141, which forms a seal against the seat member 137. This seal allows a relatively large volume of fluid at low pressure to complete the process of closing the calipers. As the valve spool 57 travels further, the transfer sleeve 139 transfers a load (representative of the brake pressure in the bore portion 75) to the seat member 137 and begins to collapse the springs 133 and 135.

As the springs 133 and 135 collapse, the relief sleeve 141 bottoms against a lock ring 153 on the valve spool 57 (see FIG. 8). Additional valve spool travel begins gradually to relieve pressure in the bore portion 73 by separating the relief sleeve 141 from the seat member 137 and allowing fluid to escape from the bore portion 73, through the passage 151, and then through the gap between the valve spool 57 and the seat member 137.

As the manual force applied to the valve spool 57 is increased, the portion of the forces exerted on the seat member 137 resulting from the pressure in the bore portion 73 decreases while the portion of the force exerted on the seat member 137 from pressure in the bore portion 75, by way of the transfer sleeve 137, increases. The result is a substantially reduced input force for any given pressure at the work port 53. It should be understood that the separation of the relief sleeve 141 from the seat member 137 does not occur at a particular position in the movement of the valve spool 57, nor does it occur at a particular pressure in either of the bore portions 73 or 75. Instead, it is a matter of a balance in the various forces being applied to the seat member 137 by the small piston 61, the large piston 63, the springs 133 and 135, and the transfer sleeve 139.

Figure 7:
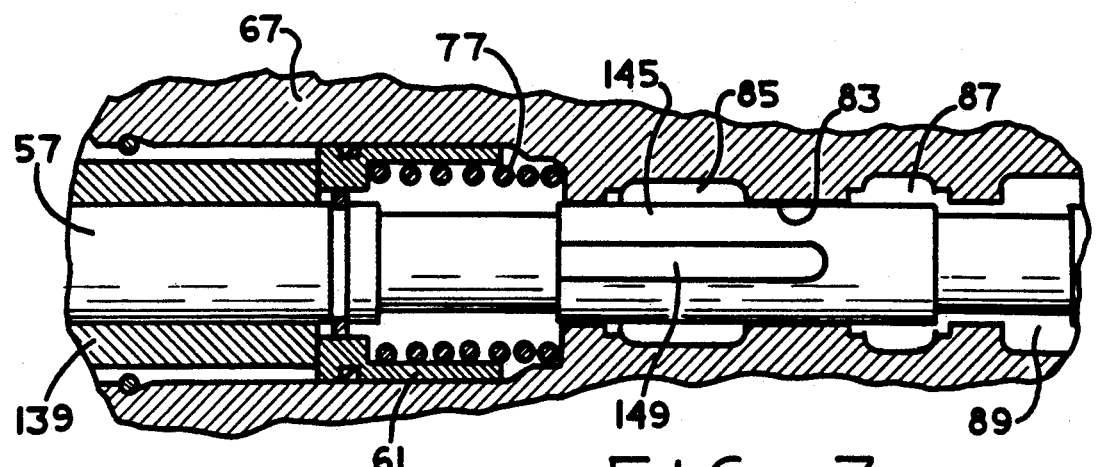
FIG. 7 is an enlarged, fragmentary, axial cross-section, similar to FIGS. 5 and 6, with the valve spool in its maximum displacement position.

Referring next to FIG. 7, the valve spool 157 has now been moved to its position of maximum displacement in the manual brake mode. This maximum displacement position of the valve spool is being illustrated and described for several reasons. First, it should be noted that the axial groove 149, which is always in fluid communication with the work port 53 through the bore 81 and bore portion 75, does not reach the load signal cavity 87, such that manually generated brake pressure is never communicated to the load signal system which controls the priority valve 17. At the same time, the load signal cavity 87 is again in communication with the return cavity 89, so that if any fluid pressure has built up in the cavity 87 as a result of leakage, such leakage is drained and not given an opportunity to create a false brake load signal at the shuttle inlet 119.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A brake valve for use in a hydraulic system of the type including a source of pressurized fluid, and means operable to very the fluid output of the source in response to a system load signal; a priority hydraulic circuit connected to receive pressurized fluid from the source, in parallel with said brake valve, the priority hydraulic circuit including means operable to generate a priority load signal representative of the demand for fluid by the priority hydraulic circuit; and brake valve being of the type including housing means defining a fluid inlet port adapted to be connected to the source of pressurized fluid, a work port adapted to be connected to a fluid pressure operated brake actuator, a return port adapted to be connected to a system reservoir, and a valve bore interconnecting said fluid inlet port, said work port, and said return port; a valve spool reciprocable in said valve bore and having an end extending outside said housing means for forcible, manual reciprocation of said valve spool; said valve spool having a neutral position blocking fluid communication from said fluid inlet port to said work port, a power brake position permitting fluid communication from said inlet port to said workport, and a manual brake position in which a piston assembly is operable to generate fluid pressure at said work port, in response to movement of said valve spool, and in the absence of pressurized fluid at said fluid port; characterized by:
   (a) said housing means defines a brake load signal chamber adapted to be connected to the system load signal;
   (b) said valve spool, in said neutral position, blocks fluid communication between said work port and said brake load signal chamber, and permits fluid communication between said brake load signal chamber and said return port;
   (c) said valve spool, in said power brake position, blocks fluid communication between said brake load signal chamber and said return port, and permits fluid communication between said work port and said brake load signal chamber; and
   (d) said valve spool, in said manual brake position, blocks fluid communication between said work port and said brake load signal chamber.

2. A brake valve as claimed in claim 1, characterized by said manual brake position includes said valve spool having a maximum displacement position in which said valve spool blocks fluid communication between said work port and said brake load signal chamber, and permits fluid communication between said brake load signal chamber and said return port.

3. A brake valve as claimed in claim 1, characterized by said housing means includes shuttle means having a first shuttle inlet connected to said brake load signal chamber, a second shuttle inlet adapted to be connected to the priority load signal, and a shuttle outlet adapted to be connected to the system load signal.

4. A brake valve as claimed in claim 1, characterized by said fluid inlet port including flow limiting means operable to limit fluid flow through said fluid inlet port to a predetermined maximum flow rate.

5. A brake valve as claimed in claim 1, characterized by said housing means defines a relatively small piston bore in fluid communication with said work port, and a relatively large piston bore in fluid communication with said small piston bore; said piston assembly includes a relatively large piston, disposed in said large piston bore, and movable with said valve spool, when said valve spool is in said manual brake position, to displace fluid from said large piston bore to said small piston bore.

6. A brake valve as claimed in claim 5, characterized by relief valve means operably associated with said relatively large piston to relieve fluid pressure in said large piston bore in excess of a predetermined maximum pressure, thus limiting the manual force required to move said valve spool and said large piston.

7. A brake valve for use in a hydraulic system of the type including a source of pressurized fluid; said brake valve being of the type including housing means defining a fluid inlet port adapted to be connected to the source of pressurized fluid, a work port adapted to be connected to a fluid pressure operated brake actuator, a return port adapted to be connected to a system reservoir, and a valve bore interconnecting said fluid inlet port, said work port, and said return port; a valve spool reciprocable in said valve bore and having an end extending outside said housing means for forcible, manual reciprocation of said valve spool; said valve spool having a neutral position blocking fluid communication from said fluid inlet port to said work port, a power brake position permitting fluid communication from said inlet port to said work port, and a manual brake position in which a first piston member axially movable in a first piston bore is operable to generate fluid pressure at said work port, in response to movement of said valve spool, and in the absence of pressurized fluid at said fluid inlet port; characterized by:

(a) said housing means defining a second relatively larger piston bore in fluid communication with said first piston bore when said valve spool is in said neutral position;
(b) a second, relatively larger piston member being axially movable in said second piston bore;
(c) means operably associated with said valve spool to cause movement of said second piston member, in response to movement of said valve spool toward said manual brake position, thereby displacing fluid from said second piston bore to said first piston bore.

8. A brake valve as claimed in claim 7, characterized by said second piston bore being in fluid communication with said system reservoir when said valve spool is in said neutral position, and said means operable to cause movement of said second piston member in response to movement of said valve spool toward said manual brake position, is operable substantially to restrict fluid communication from said second piston bore to said system reservoir.

9. A brake valve as claimed in claim 8, characterized by relief valve means operable to relieve fluid pressure from said second piston bore to said system reservoir, whenever fluid pressure in said second piston bore exceeds a predetermined, maximum pressure, as said valve spool moves through said manual brake position.

10. A brake valve as claimed in claim 9, characterized by said relief valve means includes means operable, in response to the build-up of fluid pressure in said first piston bore, to move said relief valve means to a condition operable to provide increasing fluid communication from said second piston bore to said system reservoir, thus limiting the manual force required to move said valve spool and said first and second piston members to build brake pressure at said work port.

* * * * *